2,705,731

SEPARATION OF GAMMA BENZENE HEXACHLORIDE

James H. Dunn, Baton Rouge, La., assignor to Ethyl Corporation, New York, N. Y., a corporation of Delaware No Drawing. Application April 4, 1952,
Serial No. 280,659

4 Claims. (Cl. 260—648)

This invention relates to the manufacture of a benzene hexachloride product containing above about 96 percent of the gamma isomer thereof from an isomeric mixture of benzene hexachloride formed in the catalyzed addition chlorination of benzene.

It is known that benzene hexachloride may be produced by reacting chlorine with benzene under conditions which promote additive chlorination. The "crude" product so-obtained is a mixture of stereoisomers, of which the gamma isomer is present in between 10 to 20 percent by weight and generally in about 13 percent by weight. The latter isomer has considerably more insecticidal activity than the other benzene hexachloride isomers, and, for this reason, is frequently desired in relatively pure form, i. e. above about 96 percent and preferably above 99 percent.

One method for separating the gamma isomer from a crude benzene hexachloride mixture is disclosed in U. S. Patent No. 2,553,956. In accordance with this process, the crude benzene hexachloride mixture is extracted with a controlled quantity of a lower aliphatic alcohol, such as methanol or ethanol, and the gamma-rich extract is thereafter crystallized to produce a gamma benzene hexachloride product having above about 96 percent purity. Only sufficient quantities of solvent are employed in the extraction operation to remove substantially all of the gamma isomer, while leaving relatively large quantities of the alpha isomer undissolved. Upon separation from the solids, the extract contains between about 30 and 40 percent by weight of the gamma isomer. This extract is then concentrated by vaporization of solvent, cooled, and allowed to crystallize to yield a high-gamma crystalline product. The extraction and crystallization operations are both carried out at relatively low temperatures, generally between about 0°–30° C., and preferably at about 15° C.

The above process will produce the high-gamma product noted above, but the yields using this process leave much to be desired. In general, the yields of the above separation process, based on the starting weight of gamma in the crude benzene hexachloride, are at the untenably low yields of between about 10 and 30 percent when attempting to produce products containing above about a 99 percent gamma isomer purity. Since the gamma isomer is formed initially only in concentrations of 13 percent of the crude benzene hexachloride, the overall yield from chlorine and benzene with the prior process is in the order of 1 to 2 percent.

It is accordingly an object of the present invention to provide a method for obtaining a high-gamma product having a purity above about 96 percent from a crude isomer mixture of benzene hexachloride.

Another object of this invention is to provide a process of the above type characterized by providing high overall yields of the valuable gamma isomer from the crude isomer mixture.

Other objects and advantages of the invention will become apparent as the description proceeds.

It has been found that the 30–40 percent gamma methanol extract, discussed above, may be treated to produce extremely pure gamma products in hitherto unattained yields if the crystallization conditions and techniques are controlled within relatively close limits. The crystallization technique involves the use of at least two separate crystallization steps. The first crystallization is controlled to produce a product having a purity between about 80–90 percent, and the second crystallization involves the redissolving of this relatively pure crystal product with controlled quantities of methanol and recrystallizing the same to produce a product above 96 percent purity and preferably above about 99 percent purity.

More specifically and in accordance with this process, after extraction of a crude benzene hexachloride product with methanol solvent and separation of the extract from the undissolved solid fraction, the extract is then concentrated by removing between about 50–75 percent of the methanol. The concentrated extract is then cooled to a temperature between about 0°–30° C. and allowed to crystallize. The crystallization is terminated when the high-gamma fraction has a purity of between 80 and 90 percent of the gamma isomer, as noted above. After separation of the latter high-gamma fraction from the supernatant liquor, the crystals are redissolved in fresh methanol solvent. The weight of methanol should be at least three times the weight of the high-gamma fraction. The latter solution is then concentrated by removing sufficient solvent to give a methanol to benzene hexachloride ratio of between 1.25:1 and 2.5:1. The so-formed concentrated solution is then cooled to between about 0° and 30° C. to crystallize a second high-gamma isomer fraction having a gamma isomer concentration above 96 percent and preferably above about 99 percent. This exceedingly pure gamma fraction is then separated from the supernatant liquor.

Surprisingly, it has been found that the range of concentration of the extract and the control of the crystallization thereof to give a product between about 80 and 90 percent is critical if a high purity product is desired in commercially satisfactory yields. A preferred range is between about 80–85 percent gamma isomer. For example, when it is attempted to crystallize a product approaching 99 percent purity in a single crystallization operation from an extract of crude benzene hexachloride, the yield of the gamma isomer is excessively low, generally between about 20 and 30 percent. Moreover, when the crystallization is attempted in two steps from the 20–30 percent gamma extract to a high-gamma fraction (above about 96 percent) and the first crystallization is controlled to yield a product below 80 percent purity of the gamma isomer, the overall yields likewise are exceedingly low. To illustrate, when an extract is concentrated and then crystallized so as to obtain a product having a purity of about 60 percent and then recrystallized to produce a product above about 98 percent, the overall yield from the process falls to an entirely unsatisfactory value of 10 percent, based on the weight of gamma in the crude benzene hexachloride isomer mixture. In contrast, the present invention permits the recovery of 96–99 percent purity gamma isomer products in yields consistently above 50 percent and generally between 60–70 percent.

The extract ratio of methanol:benzene hexachloride usable in this process depends upon the gamma isomer concentration in the crude benzene hexachloride mixture, although the weight of methanol should be at least half the weight of the benzene hexachloride. The pure gamma isomer has a solubility of 7.99 grams per 100 grams of methanol at 20° C. At higher temperatures, the gamma solubility in methanol increases. For example, at 40° C., its solubility is 13.5 grams per 100 grams of methanol and at 60° C. its solubility is 26.3 grams per 100 grams of methanol. In actual operation, it is normally preferred to use slightly less than theoretical amounts of methanol so as to effectively reduce the alpha isomer concentration in the extract. In general, a 3:1 to 1.5:1 ratio of methanol to benzene hexachloride is preferred at operating temperatures between about 0° to 30° C.

The separation of the high-gamma extract from the undissolved solids, principally alpha isomer, in the extraction operation and the separation of the high-gamma crystals from the mother liquor in the crystallization operations may be effected by any of a large variety of process equipment. Generally, it is preferred to use a centrifuge for this operation so as to minimize the holdup of gamma-rich liquid in the low-gamma cake following extraction and of the low-gamma liquid in the high-gamma cake following the crystallization operations.

The concentration of the extract is effected preferably by flashing or otherwise vaporizing the methanol solvent at the boiling point of the solution. The actual temperature of this operation is a function of the system pressure but is normally about 65° C. Between about 50–75 percent of the methanol is removed in the first concentration step, depending upon the yield and purity of product desired and the extraction and crystallization temperatures employed. In general, for similar product purity, lower temperature crystallization will permit lower degrees of flash. In normal operation, however, product purity is generally controlled by the degree of flash or concentration. For example, using a 2:1 methanol to benzene hexachloride extraction ratio and 15° C., 50 percent concentration of the solution produces a 97 percent purity product; 60 percent flash produces a 96 percent purity product; and 70 percent flash produces an 80 percent purity product. The values given are at substantially equilibrium conditions. Thus, when using a 50 percent flash of the methanol solution, lower crystallization temperatures are desired so as to obtain a product purity between about 80 and 90 percent of the gamma isomer, as noted above.

The weight of methanol desired to dissolve the high-gamma crystals obtained following the first crystallization should not be less than three times the weight of the high-gamma fraction. In general, this ratio should be between about 3:1 and 5:1. Concentration of the latter redissolved solution should give a concentration liquor having a methanol:benzene hexachloride ratio between about 1.25:1 and 2.5:1, and preferably 1.5:1.

The following examples will illustrate the advantages of the present invention:

*Example I*

In this example, a high purity gamma product was desired using a single crystallization operation. 500 grams of crude benzene hexachloride were extracted in 100 grams of methanol at a temperature of 15° C. The crude benzene hexachloride contained 13 weight percent of the gamma isomer. The solution was stirred for 30 minutes and 26 percent of the solid fraction dissolved in the methanol. After separation of the extract from the undissolved benzene hexachloride, the extract was heated to a temperature of 65° C. Fifty percent of the methanol was removed by distillation. The concentrated extract was cooled to 15° C. and allowed to crystallize. A 97 percent gamma product was obtained. The overall gamma yield was 34 percent.

*Example II*

This example illustrates the undesirability of obtaining a low purity product in the first crystallization step, prior to recrystallizing the product to produce a high-gamma fraction. 500 grams of crude benzene hexachloride were extracted with 1,000 grams of methanol at 15° C. The mixture was stirred for 30 minutes and 26 percent of the solids dissolved. After separation of the gamma-rich extract from the solid fraction, the extract was heated to 65° C. The extract solution was concentrated, the concentrated extract was then cooled to 15° C. and crystallized. The product had a purity of 62 percent gamma isomer. After separation of the crystals from the mother liquor, they were redissolved in fresh methanol to give a methanol:benzene hexachloride ratio of 8:1. This solution was then heated to 65° C. and 30 percent of the methanol was removed. The concentrated extract was cooled to 25° C. and permitted to crystallize. Although the product had a purity of 98.0 percent gamma isomer, the overall yield was only 10 percent.

*Example III*

This example illustrates the advantages of the present invention as contrasted to Examples I and II. 500 grams of benzene hexachloride, containing 13 percent of the gamma isomer, were extracted with 1,000 grams of methanol at a temperature of 15° C. The mixture was agitated for 30 minutes. 27 percent of the solids were dissolved in methanol. After separation of the extract from the undissolved solids, the extract was heated to 65° C. and 70 percent of the methanol was removed. The extract was cooled to 15° C. and allowed to crystallize. This product had 81 percent gamma content and was obtained in a yield of 96.5 percent, based on the extract content. The 50 grams of product so-obtained were then redissolved in 250 grams of methanol. This solution was then heated to 65° C. and 60 percent of the methanol was removed. This concentrated extract was then cooled to 15° C. and allowed to crystallize for about 15 minutes. The latter crystallized product had a purity of 99 percent gamma isomer. The yield of the second crystallization was 87.5 percent, giving an overall yield from crude benzene hexachloride of 57 percent.

*Example IV*

When a higher purity product is desirable, somewhat lower yields are obtained. In this example, the 81 percent gamma product prepared as in Example III was dissolved in 300 grams of methanol giving a 3:1 methanol:benzene hexachloride weight ratio. The solution was heated to effect dissolution. The solution was then heated to about 65° C. and 33 percent of the methanol was flashed. The concentrated solution was then cooled to 30° C. and crystallized. The product had a purity of 99.4 percent in a yield, from the 81 percent product, of 82 percent. This corresponds to an overall yield from crude benzene hexachloride of 53.4 percent.

*Example V*

When the process of Example III is repeated, carrying out the first crystallization to obtain a product of 89 percent gamma and then redissolving, concentrating, and crystallizing to obtain a product above 99 percent, the overall yield of the gamma isomer from crude benzene hexachloride is in excess of 60 percent.

*Example VI*

An 86.7 percent gamma isomer product was dissolved in methanol in accordance with Example III, concentrated and crystallized to give a 99.3 percent purity product in 93.0 percent yield.

*Example VII*

Even higher yields are obtainable from 80 to 85 percent purity materials when slightly lower product purities are desired. When an 82 percent product from a first crystallization is redissolved in methanol, concentrated and recrystallized, a 98.8 percent purity product is obtained in 91 percent yield.

It is believed apparent from the foregoing that the present invention provides a process for obtaining an extremely high purity gamma product in high yields from crude benzene hexachloride isomeric mixtures. By carrying out the process step-wise, using two separate crystallization operations following extraction with methanol solvent, and controlling the degree of concentration of the high-gamma liquor, the extraction temperature and the crystallization temperature to produce a first crystallization product having a purity between about 80 and 90 percent, a final product above 96 percent gamma purity may be obtained in yields above 50 percent of the original gamma isomer content in crude benzene hexachloride starting material, and frequently between 60 and 70 percent overall yield.

I claim:

1. In a process for treating the additive chlorination product of benzene to obtain therefrom a benzene hexachloride product having a purity of the gamma isomer above about 96 percent in which said isomer is extracted with cold methanol in such amount as to dissolve only a part of said mixture and leave a substantial portion of said mixture undissolved, the weight of said methanol being not less than half the weight of said isomer mixture, the steps of concentrating the resulting methanol extract solution by removing between about 50–75 percent of said methanol, cooling said concentrated mixture to between about 0°–30° C. to crystallize a high-gamma isomer fraction containing between about 80–90 percent of the gamma isomer, separating the precipitated crystals of said high-gamma fraction from the supernatant liquor, redissolving said fraction in fresh methanol solvent, concentrating said redissolved solution by removing methanol therefrom to give a second concentrated solution having a methanol to benzene hexachloride ratio of between 1.25:1 and 2.5:1, cooling said concentrated solution to a temperature of between about 0°–30° C. to crystallize a second high-gamma isomer fraction, and separating said latter crystallized fraction having a purity above about 96 percent from the supernatant liquor.

2. A process in accordance with claim 1 and being further characterized in that the weight of methanol used to dissolve the product of the first crystallization is between about 3 and 6 times the weight of the high-gamma fraction.

3. A process in accordance with claim 1 and being further characterized in that the second concentrated solution has a methanol to high-gamma fraction weight ratio of about 1.5:1.

4. In a process for treating the additive chlorination product of benzene to obtain therefrom a benzene hexachloride product having a purity of the gamma isomer above about 99 percent in which said isomer is extracted with cold methanol in a ratio of about two parts by weight of methanol to one part of benzene hexachloride and separating the resultant solution from the undissolved portion of the said isomer mixture, the steps of concentrating said solution by removing about 70 percent by weight of said methanol, cooling said mixture to a temperature of about 15° C. to crystallize a high-gamma isomer fraction containing between about 80–85 percent of the gamma isomer, separating the precipitated crystals of said 80–85 percent fraction from the supernatant liquor, redissolving said 80–85 percent fraction in methanol to give a solution having a methanol to benzene hexachloride ratio of between about 5:1 to 3:1, concentrating said redissolved solution to give a methanol:high-gamma fraction weight ratio of between about 1.25:1 and 2.5:1, cooling said solution to a temperature between about 15° to 30° C., to crystallize a second gamma isomer fraction having a purity above about 99 percent, and separating said pure gamma fraction from the supernatant liquor.

References Cited in the file of this patent

Slade, "Chemistry and Industry," Oct. 13, 1945, pages 315–6.